United States Patent Office 3,445,241
Patented May 20, 1969

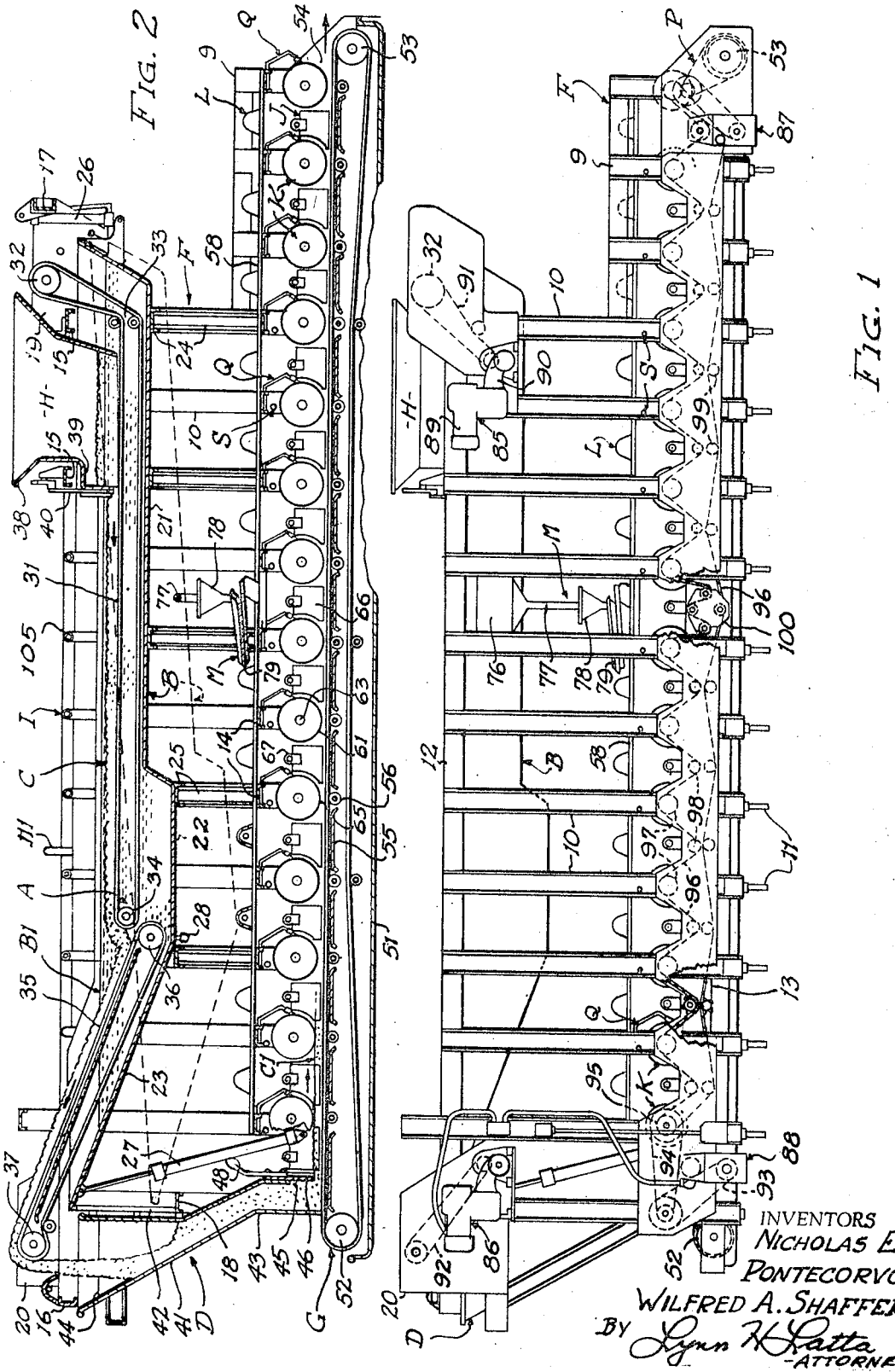

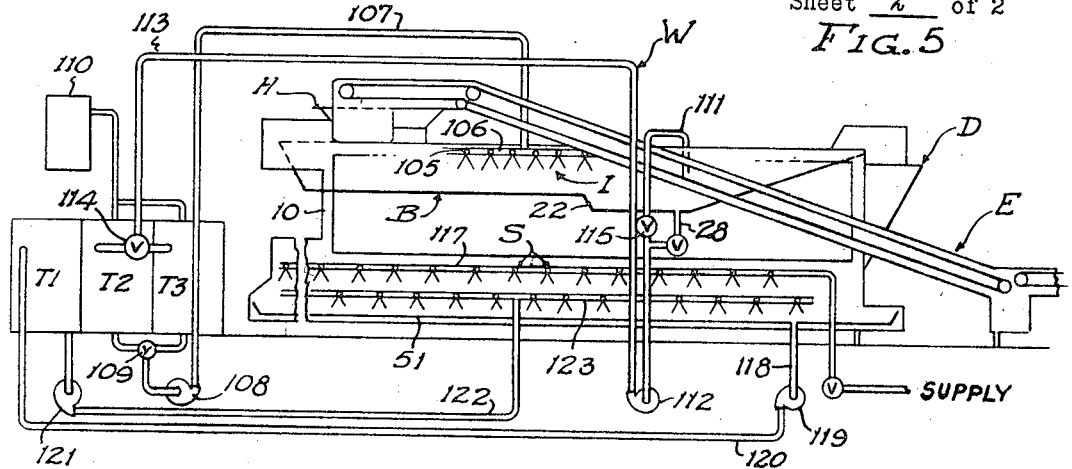
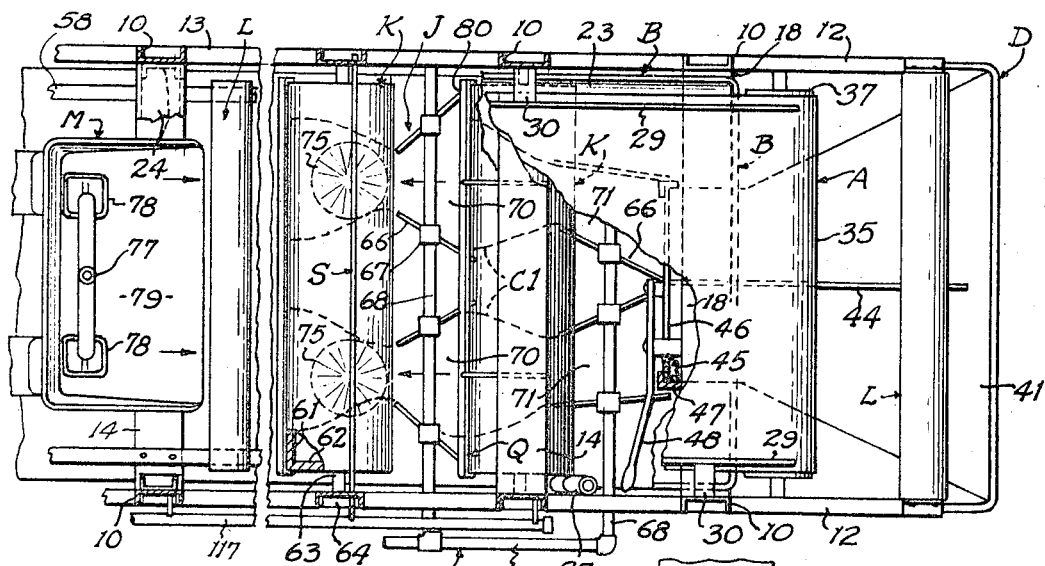
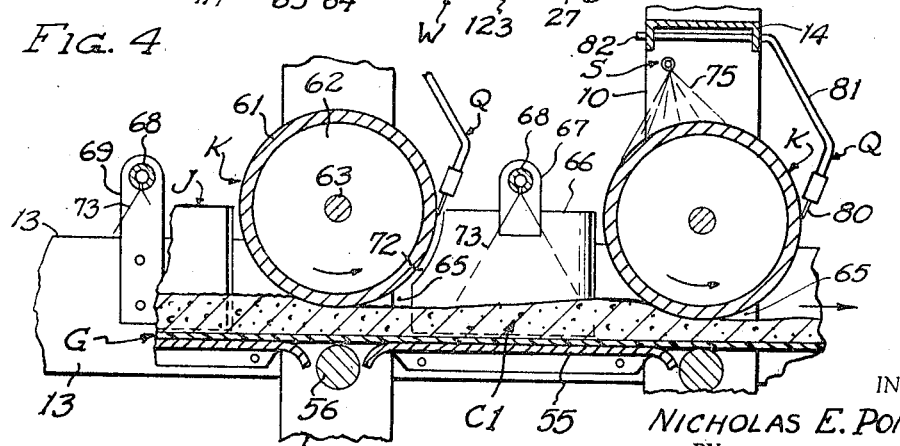

3,445,241
PROCESS FOR PRODUCING PLASTICIZED CHEESE FROM RAW CURD
Nicholas E. Pontecorvo, Tarzana, and Wilfred A. Shaffer, Los Angeles, Calif., assignors, by mesne assignments, to American Foods Machinery Corporation, a corporation of Tennessee
Continuation-in-part of application Ser. No. 489,833, Sept. 24, 1965. This application Dec. 12, 1966, Ser. No. 601,177
Int. Cl. A23c 19/12
U.S. Cl. 99—116                  13 Claims

ABSTRACT OF THE DISCLOSURE

This invention provides a process and apparatus whereby raw cheese curd is first softened by passing it through a hot water bath in a shallow layer on a moving conveyor; then removing the softened curd from the bath and allowing it to settle into an agglomerated curd body; then kneading the softened curd by subjecting it, in the form of a ribbon, to the effect of intermittent compressive rolling by a plurality of rolls while containing the ribbon so as to limit its width of spreading.

*Cross reference to related application*

This application is a continuation-in-part of our pending application Ser. No. 489,833, filed Sept. 24, 1965, for: Method and Apparatus for Processing Cheese Curd into Plasticized Cheese.

*The prior art*

The common commercial method of processing homogenous cheeses such as mozzarella is a batch method wherein water at approximately 180° F. is added to a large batch of curd in a vat, the water being sufficiently hot or of appropriate volume so that upon equalization of the temperature throughout the body of curd, an average temperature of approximately 130° F. (the optimum temperature) can be equalized throughout the batch of curd. However, before such equalization is attained, usually the curd in the outside of the batch is overcooked, resulting in driving off a considerable portion of its fat content and damaging the quality of the outer layers of curd before the stirring apparatus can fairly mix the hot water into the internal area of the curd body. After the addition of the hot water to the curd, the batch is subjected to prolonged stirring to effect absorption of the water into the curd and to reduce the curd from nodule form to a more homogenous, softened state. It is subsequently necessary to remove portions of the softened cheese body and to subject them to kneading operations to reduce the water content and to further compact the cheese body into the smooth, uniform, plasticized texture of Mozzarella and other cheeses of the plasticized type. After the plasticized cheese has been molded and cooled it is steeped in brine to add a required salt content, which requires steeping for an extended period of time.

In the patented art, Hensgen Patent No. 2,768,083 discloses the kneading of cheese curd between gear-toothed rollers; Dzenis No. 2,840,909 discloses the use of an auger to draw a body of curd axially through a tubular passage. Mauk No. 3,117,008 discloses vat-stirring of the curd as in the commercial art outlined above, followed by overnight pressing in a hydraulic cheese press.

*Summary of invention*

A principal object of the invention is to provide a continuous method of cheese processing wherein curd is first softened by heat and moisture uniformly applied to a spread-out layer of the curd, and is subsequently worked by kneading uniformly applied to a moving curd ribbon of limited depth. A further object is to provide an intermediate step wherein the softened curd, still in a relatively loose state, is agglomerated by gravitational settling, into a matted body which is developed into a moving ribbon for kneading. Another object is to provide an efficient kneading operation by moving the curd ribbon on a solidly supported belt beneath spaced kneading rolls which alternately flatten the ribbon and then allow it to thicken between rolls. A still further object is to provide an intensified and fully controlled kneading operation on a moving belt comprising alternate horizontal and vertical kneading such as to maintain a substantially constant average ribbon width as well as highly effective kneading.

By softening and then kneading the cheese in shallow, moving streams, the invention provides volume processing of a rapidity such as to reduce overall processing time from several days (required by the average batch process) to a time period as low as ten minutes, with a completely processed cheese such as mozzarella, being delivered ready for packaging. An important factor in attaining such rapidity is the provision for uniform dispersion of salt throughout the mass of cheese during kneading thereof. This is accomplished by shaking dry salt into the curd during an intermediate stage of kneading sufficiently in advance of discharge of the completed product, so as to utilize the remaining stages of kneading to thoroughly work the salt into the cheese body.

Another object of the invention is to minimize fat loss. This is accomplished by (a) utilizing a softening bath only a few degrees hotter than the optimum softening temperature of the particular curd being processed, so as to minimize the melting of fat during the softening operation; (b) limiting agitation of the softening bath relative to the curd to only the relative movement necessary to carry the curd through the bath on a slow-moving belt (e.g., travelling about 15 feet in about 5 minutes); and (c) removing the softened curd from the bath before kneading, and kneading the curd with only a minimum amount of water present (e.g., the amount which remains adhering to the curd after removal from the bath, plus the minimum amount required for lubricating the kneading rolls). The net result is that fat loss is drastically reduced as compared to the existing batch process commonly in use, and the fat content of the milk used in making the curd can be correspondingly reduced, for any legally required fat content in the finished product.

These and other objects will become apparent in the ensuing specifications and appended drawings, wherein:

FIG. 1 is a front elevational view of a processing machine exemplifying the invention;

FIG. 2 is a longitudinal sectional view of the same;

FIG. 3 is a fragmentary detail longitudinal sectional view thereof;

FIG. 4 is a fragmentary, multi-level plan view of portions of the machine, facing in a direction opposite to that of FIG. 1; and FIG. 5 is a schematic diagram of the machine and its water circulating system, viewing the back side of the machine.

Referring now to the drawings in detail, I have shown therein, as an example of one form in which the apparatus of the invention may be embodied, a processing machine comprising, in general, a frame structure F in which is supported a hopper H at one end of the machine, to receive raw cheese curd from a suitable elevator E (FIG. 5); a conveyor system A including a horizontal belt to carry the curd through a curd softening heated water bath in a tank B extending longitudinally in the upper area of frame F, and an elevator belt to carry the softened curd C out of tank B, discharging it into a downspout D at the other end of the machine, from which the curd C is delivered in two laterally separated ribbon-like webs; a supporting belt G extending full length of the machine in the lower area thereof, onto which the curd webs are directed by downspout D; a series of kneading rolls K arranged in longitudinally spaced array above supporting belt G for rotation on transverse axes, beneath which the curd webs are carried by belt G and kneaded by rolls K into webs C1 (FIG. 3) of decreasing thickness and increasingly compact, plasticized texture; a plurality of infra-red lamps L mounted in transversely extending, longitudinally spaced array above the spaces between rolls K, for maintaining the temperature of curd web C1 in a suitable state of plasticity; a hot water injection system I above tank B; a plurality of spray heads S for delivering fine mist sprays on the upper sides of respective rolls K, for lubricating them to prevent adhesion of curd webs C1 to the rolls; doctor blades Q for clearing rolls K of any adhering curd particles; a plurality of baffles J for crowding the sides of webs C1 inwardly so as to reduce the width and increase the thickness after each pass under a roll K in which they are thinned and widened; removable salting apparatus M for sprinkling granulated salt upon the webs C1; a water circulating system W (FIG. 5) for recirculation of water to softening tank B and spray heads S; and a drive system P for power-driving the rolls K and belts A and G.

*Detailed description*:

Frame F comprises a plurality of longitudinally spaced vertical legs 9, 10 having respective adjustable support feet 11, for levelling; aligned bridge bars 12 and 13 connecting the upper and lower ends of legs 10 along respective upper and lower side margins of the machine; and cross bars including among others, bars 14, 15, 16, 17 and 18, extending transversely between and securing the respective sides of the frame in laterally-spaced relation. Frame F may also include upward extensions 19 and 20 at its respective ends. Cross bars 14 are disposed above respective rolls K, their ends being attached to respective legs 9, 10.

Tank B, of stainless steel or equivalent non-corrosive material, includes a horizontal receiving portion 21 extending from beneath receiving hopper H, an intermediate sump portion 22, and a ramp portion 23 extending from sump 22 to its discharge end which may slightly overhang downspout D. The tank is supported normally by removable yoke-shaped props 24, 25 having legs resting on cross bars 14 and transverse head beams engaged beneath the tank B, the upper ends of the legs being hinged to the ends of the head beams so as to be foldable for removal when the tank is to be cleaned. During the cleaning periods, involving draining the water from the tank, it is raised and lowered by operation of a pneumatic jack 26 which suspends its receiving end from cross bar 17, and a pair of pneumatic struts 27 which are propped between the two corners of its discharge end and respective pivotal connections to frame F in spaces between the ends of the first kneading roll K and the adjacent sides of the frame (FIG. 4). In addition to removal of props 24, 25, the salting apparatus M is removed in preparation for lowering the tank.

In its lowered position, shown in phantom in FIG. 2 the tank is tilted, with its discharge end lowered more than its receiving end, and with its receiving portion 21 and its ramp portion 23 both having their bottoms inclined downwardly toward a low area located at the junction between sump 22 and ramp 23. At this junction, a drain pipe 28 is connected to the sump 22. Cleaning is thus performed by flushing from both ends of the tank to the drain 28. The pneumatic jack 26 and struts 27 are swingable on their pivotal mountings to accommodate such longitudinal shifting movement of tank B as may be required to clear its discharge end from slightly overhanging relation to downspout D during the lowering of this end of the tank.

A hot water bath B1 is maintained in tank B at a level just above the upper surface of the layer of curd C carried by the conveyor A, fully immersing the curd layer.

Conveyor system A comprises a receiving belt 31 operating in a horizontal position in receiving portion 21 of tank B for its full length except for its receiving end which extends from a drive roller 32 downwardly into the receiving end of the tank behind the hopper H. From this downwardly extending portion, the belt extends around idler rollers 33, thence forwardly beneath hopper H to the drain end of sump 22 and around a return roller 34, with an upper stretch moving toward the sump as indicated by arrow, and a lower return stretch moving toward the hopper H. An elevating belt 35 has an upper, conveying stretch 35 extending from an idler roller 36 in the drain area of sump 22 beneath the return roller 34, along an upwardly inclined path of movement indicated by arrow, generally parallel to the ramp 23, and beyond the discharge end of the tank to a drive roller 37 disposed over an idler roller therebeneath, and back to idler roller 36 in a return stretch. Drive rollers 32 and 37 are mounted in frame extensions 19 and 20 and are driven by drive system P. Retainer strips 29 (FIG. 4) mounted on legs 10 by means of spacer blocks 30, have their lower edges fitted to the upper surfaces of belts 31 and 35 so as to contain the curd on the belts, preventing loss of curd over the side margins of the belts.

Hopper H has a throat extending downwardly from a receiving mouth 38 into tank B between cross bars 15, on which it is supported, and a delivery nozzle 39, projecting toward the discharge end of conveyor belt 31. The throat and nozzle 39 have a common open bottom fitted to the belt 31 to deliver curd thereon, and nozzle 39 has an open discharge end which can be closed or partially closed by a vertically adjustable gate 40 for feeding the curd forwardly on belt 31 at a controlled depth. Gate 40 is provided with operating mechanism similar to that of downspout delivery gate 45 hereinafter described.

Downspout D includes a receiving hopper portion 41, disposed beneath the discharge end of conveyor system A and hung upon a suitable bracket beam 42 which may extend diagonally between a supporting attachment of its lower end to cross bar 18 and an attachment (not shown) of its upper end to a side of frame F near the top thereof. From hopper portion 41, the downspout D extends downwardly to a lower portion 43 which has an open lower end disposed above the starting end of supporting belt G and closely associated therewith. Lower spout portion 43 provides an agglomerating chamber in which cheese curd C, fed downwardly from the discharge end of elevator belt 35, settles into a matted body which the curd particles adhere to one another under a packing action of the decending curd. A separator panel 44, disposed in a vertical median plane midway between the sides of the downspout (FIG. 4) divides the curd into two descending streams, and thus two laterally separated streams C1 of agglomerated curd are fed from the lower end of the downspout, through a transverse outlet 45, onto the suporting belt G. Outflow is regulated by a vertically adjustable gate 46 which is slidably guided in ways 47 (FIG. 4) at the sides of lower spout portion 43, and is raised and lowered by an operating lever 48.

Supporting belt G extends full length of the machine above a drip pan 51 of corresponding extent, with an upper carrying stretch travelling as indicated by arrows, from an idler roller 52 at its receiving end beneath downspout D to a drive roller 53 at a discharge outlet 54 at the opposite end of the machine, from which the ribbons of completely processed cheese may be conveyed by a suitable elevator (not shown) to suitable molding and packaging apparatus.

The carrying stretch of belt G is supported by a succession of alternate transversely extending slide plates 55 and rollers 56 which cooperate to support the belt solidly in a substantially horizontal plane, thus providing an unyielding supporting surface upon which the curd ribbons C1 are kneaded by rollers K and baffles J. The ends of rollers 56 are journaled in frame legs 10 and the ends of slide plates 55 are secured to lower side bridge bars 13. Belt G is driven by roller 53 which receives its drive from one of the power units P.

Kneading rolls K (FIG. 3) may comprise tubular cylinders 61 of non-corrosive metal (e.g. stainless steel) with external surfaces that are smooth to minimize adhesion of the curd ribbons thereto, with closed ends 62 to exclude the entry of curd particles, and with mounting shafts 63 which have projecting ends journaled in bearings 64 carried by frame legs 10, 11. For satisfactory operation in feeding the curd ribbons beneath them while compressing the curd, the rolls K are of fairly large diameter (e.g. in the range of 10″–12″). Rolls of smaller than 10″ diameter are less satisfactory, especially in the initial group of 4 to 6 rolls above the receiving end of belt G, where maximum compression and reduction in depth of the curd takes place. Smaller rolls tend to cavitate (lose their driving grip on the curd ribbons) with the curd piling up ahead of the rolls instead of being drawn beneath them. For adequate stages of kneading operation, a substantial number of rolls (e.g. 12–15) spaced apart somewhat less than roll diameter, are employed. Rolls K are all individually driven by mechanism P.

Rolls K are spaced above supporting belt G to provide a succession of kneading gaps 65 which vary from maximum depth beneath the first roll adjacent downspout D, to minimum depth at outlet 54. Substantially all of the reduction in depth occurs beneath the first six rolls, the depth remaining substantially constant (or decreasing only slightly) beneath the remaining rolls. The maximum gap depth, beneath the first roll, is within the range of 2″–4″, a satisfactory depth being 3″–3½″, and minimum gap depth, at outlet 54, is in the range of ¾″–1½″, a satisfactory depth being 1″.

Baffle system J (FIGS. 3 and 4) comprises a plurality of baffle blades 66 affixed to respective shanks 67 fixedly mounted on tubes 68 which are suported at their ends in brackets 69 secured to frame side members 13. Blades 66 (FIG. 4) with the exception of the first set which is disposed between downspout outlet 45 and the first roller K, are arranged in sets each consisting of two pairs of forwardly converging blades defining two laterally spaced passes 70 (FIG. 4) in which the respective curd ribbons C1 are squeezed horizontally to narrowed width. The first set of blades consists of two pairs all extending diagonally outwardly from the longitudinal medial axis of the machine (one pair toward one side, the other pair toward the other side) whereby they define two passes 71 which diverge from the downspout outlets 45 so as to spread the curd ribbons C1 apart as they issue from the downspout. Thus the ribbons commence their travel beneath the rolls K along paths located substantially midway between the longitudinal medial axis of the belt G, and its side edges, the direction of travel being indicated by the arrows.

The blades 66 traverse the spaces between rolls K and may have tapered ends 72 projecting beneath rolls K and conformed to the peripheral curvature thereof.

The baffle mount tubes 68 may in some installations be provided with spray apertures for delivering downward sprays 73 of heated water which may be optionally utilized for maintaining temperature at the correct processing level, in lieu of the use of radiant heaters L. Also, where acidity may tend to rise above the correct level, sprays 73 may be utilized for leaching excess acid from the curd.

Heater group L comprises a plurality of infra-red heat units extending transversely, their ends supported upon bars 58 extending along the respective sides of the machine, carried by cross bars 14.

The spray heads S consist of small tubes extending between respective pairs of frame legs 10 and having two or more extremely fine apertures for delivering atomized sprays 75 of water mist upon the upper surfaces of rolls K to lubricate them sufficiently to inhibit adhesion of the curd ribbons to the rolls.

Salting unit M comprises a salt supply tank 76 which delivers granulated salt though a branching metering tube 77 and two distributing hoppers 78 onto a vibrator-mounted shaker pan 79 which discharges the salt over its edge as indicated by arrows in FIG. 4, into a space between two of the rolls K and thence onto the curd ribbons C1. Unit M is located at a position sufficiently in advance of discharge outlet so that salt which is sprinkled thereby in a narrow strip or strips across the widths of both curd ribbons C1, will be thoroughly worked by the kneading operations, into the cheese in uniform dispersion therein, by the time it reaches the outlet 54.

Doctor blade units Q (FIG. 4) comprise respective blades 80 carried by the lower ends of arms 81 which extend downwardly from respective shanks 82 mounted in the side webs of respective cross bars 14. The blades 80 have scraping contact with the sides of rolls K facing in the direction of travel of curd ribbons C1, where the roll peripheries are moving upwardly.

Power drive system P comprises a number of variable-speed electric drive units 85, 86, 87 and 88, mounted to frame F at the four corners of one side thereof. Each unit embodies a variable speed electric motor and a reduction gear (e.g., motor 89 and gear 90 of unit 85). From unit 85 a chain drive 91 extends to and drives conveyor drive roller 52. From unit 86, a chain drive 92 drives elevator drive roller 37. From unit 87, a two-stage, double-reduction chain drive 93, 94 carries drive to a sprocket cluster on the shaft of the first kneading roll K, from which it is transmitted by a common drive chain 96 to all remaining rolls K, the chain 96 alternately passing over sprockets 97 on the respective rolls and dipping beneath idler sprockets 98 on lower side frame bars 13, until it passes around the last roll sprocket, whence it returns in a stretch passing alternately over and under idler sprockets 99, all as indicated in phantom by dotted line in FIG. 1. Midway between the ends of the machine, the upper and lower stretches of the chain pass through a tension-adjusting unit 100.

The water circulating system W and the machine described above, in their relation to one another and to feed elevator E, are shown schematically in FIG. 5. Elevator D delivers raw curd from its upper end into receiving hopper H. Hot water injection system I comprises a plurality of discharge heads 105 traversing the machine over tank B between the upper ends of frame legs 10, in which they may be mounted. Each head has one end closed and its opposite end coupled to a feeder pipe 106 which is supplied with hot water by a delivery line 107. A pump 108 draws water selectively from one of two alternative hot water tanks T2 and T3, under control of a selector valve 109. The water is heated by heater 110 (e.g. by steam injection from a steam generator). Water is injected into tank B through heads 105 and is returned through an overflow line 111 which regulates the level of hot water in tank B at an adequate height well above the level of the curd C carried by conveyor belt 31. Water is pumped out of the tank by a pump 112 and through a return line 113 and a valve 114 to the tank from which it is being drawn. Overflow pipe 111 and drain 28 are connected selectively to pump 112 by parallel, alternative connections through valves 115.

Mist spray heads S are supplied with water from an external water supply line, so designated, through a connecting line 117. Drippings from belt G are collected in drip pan 51 and discharged through a drain outlet 118, from which it is pumped, by a pump 119, through a return line 120 into a tank T1. From tank T1 this drainage may be directed, when required, through a pump 121 and a recirculating line 122, to a manifold pipe 123 connected to the ends of baffle mount tubes 68, so as to deliver the sprays 73.

The process

In our process, raw cheese curd is fed continuously from elevator E into receiving hopper H, into the hot water bath contained in tank B. From hopper it is fed at a rate controlled by adjustment of gate 40, onto the stretch of conveyor belt 31 moving from hopper H into sump 22. From the end of belt 31, the curd drops onto elevator belt 35, which carries it up the ramp 23 and over the end of the tank B, dropping it into the hopper portion of downspout D. The curd is then in a softened, moistened condition as the result of moisture and heat absorption from its immersion in the hot water bath in tank B. The bath is maintained at a temperature in the range of 119° F.–145° F., depending upon curd acidity. The bath temperature is necessarily higher than the temperature to be imparted to the cheese (e.g. 128° F.) due to the lag in heat transfer (e.g., in a five minute interval between delivery from hopper H to discharge into downspout D); a satisfactory curd temperature range being 122° F. to 130° F. (commonly 128° F.). Where the acidity is at a proper level, temperature may range toward the lower limit, but if the acidity level is abnormally high, correction is made by adjusting the temperature to a higher level. The normal acidity level for best results is substantially in the range of 70 to 90 by sodium hydroxide titration of the whey. If curd has high fat content, it will work best at a low titration level (e.g., near 70). Where it has less fat, a higher titration level is required. Temperature is sensed by a suitable sensor in tank B and is controlled by regulating the operation of heater 110. Hot water is continuously circulated from a tank T2 or T3 into tank B through injection heads I, and back to the tank T2 or T3 through overflow line 111 and return line 113.

The softened, moistened curd particles, still in a loose state when discharged from elevator belt 35, drop through the two throats of downspout D and collect in the agglomerating chamber 5 in lower portion 43 thereof, where they settle into two agglomerated masses of adhering particles, resting upon the supporting belt G. From the agglomerating chamber the two masses of curd are fed forwardly in two streams of a depth regulated by adjustment of gate 46. These streams are spread apart by travel through passes 71 between pairs of baffle blades 66 of the first set, and are delivered beneath the first kneading roll K in positions substantially centered over the respective halves of belt G. The streams C1 are drawn through the gap 65 by the forward travel of belt G and the peripheral rotary movement of roll K, which is synchronized to the belt travel. As they pass beneath the first roll K, the streams are compressed, flattened, and widened into curd ribbons C1 as indicated by the dotted lines delineating the margins of the ribbons C1 in FIG. 4. The flattened, widened ribbons are gathered by the next set of baffle blades 66, and are narrowed and thickened by such gathering action, the narrowing being indicated in FIG. 4 and the thickening in FIG. 5. From the second set of baffles, the ribbons C1 are fed beneath the second kneading roll K, and again are flattened, further thinned and widened by the rolling action between the roll and the synchronously moving belt. In passing beneath the first group of (e.g., 6) rolls K, the ribbons are reduced to successively lesser average thickness, until the voids between curd particles are largely squeezed out and the curd material commence to assume a compacted, homogenous consistency. Without substantial further reduction in the thickness of the ribbons as they pass under the rolls, they are alternately subjected to the flattening and widening action of the rolls (vertical kneading) and the thickening and narrowing or gathering (horizontal kneading) action of the baffles J. Such alternate vertical and horizontal kneading reduces the curd material to the completely plasticized, homogenous consistency which is characteristic of mozzarella cheese, and the product which is delivered from outlet 54 is of mozzarella quality.

Excess water carried by the loose curd material as it leaves the hot water bath, is squeezed out by rolls K and drains over the edges of belt G into drip pan 51. Heaters L function to restore heat loss, maintaining the curd ribbons C1 at the temperature at which the curd leaves the tank B. Water mist sprays S maintain wet surfaces on rolls K, preventing adhesion of ribbons C1 to the rolls.

We claim:
1. A method of processing raw cheese curd into homogenous cheese, comprising the following steps:
   softening the raw curd by passing it through a heated water bath in a shallow layer on a moving conveyor, thus subjecting it to heat and moisture;
   removing the softened curd from the presence of said moisture and causing it to settle into an agglomerated curd body;
   then kneading the agglomerated softened curd by subjecting it, in the form of a ribbon, to the effect of intermittent compressive rolling by a plurality of rolls while containing the ribbon so as to limit the width of its spreading during the rolling operation, whereby to convert it to a compact, homogenous consistency.
2. The method defined in claim 1, wherein:
   said kneading step is performed immediately following said softening step, and with addition of no more than a minimum amount of moisture to the curd.
3. The method defined in claim 1, wherein the curd is formed in a shallow ribbon upon a moving conveyor, and wherein said kneading is performed upon said ribbon.
4. The method defined in claim 1, including the step of:
   sprinkling comminuted salt onto the curd ribbon during the kneading operation and utilizing said kneading to disperse the salt into and uniformly throughout the texture of said ribbon.
5. The method defined in claim 1, including the intermediate step, following the softening step, of:
   feeding said curd body onto a support moving linearly beneath kneading rolls to effect said rolling-kneading action.
6. The method defined in claim 1, including the intermediate steps, following the softening step, of:
   feeding said curd body onto a support moving linearly beneath kneading rolls to effect said rolling-kneading action while maintaining peripheral movement of said kneading rolls substantially synchronized with linear movement of said support.
7. The method of processing cheese curd as defined in claim 1,
   including the step of adding heat to the curd ribbon between successive kneading rolls, sufficient to maintain the temperature of the curd at an optimum processing temperature.
8. The method defined in claim 1, including:
   supporting said curd in the form of a ribbon upon a conveyor belt;
   carrying said ribbon on said belt beneath kneading rolls; and
   draining from the sides of said belt, excess moisture squeezed from the curd in said rolling-kneading operations.
9. The method defined in claim 1, wherein said kneading operation comprises:
   conveying the curd in the form of a shallow ribbon on a belt beneath kneading rolls; and
   pressing the sides of said ribbon inwardly in spaces between said rolls so as to gather and thicken the ribbon, whereby the ribbon is subjected alternately to vertical and horizontal kneading operations.
10. The method defined in claim 1, wherein said kneading operation comprises:

carrying said ribbon on a moving support beneath kneading rolls and between converging fixed baffle blades defining gathering passes located between the kneading rolls, and thereby subjecting the ribbon to narrowing, thickening horizontal kneading operations alternated between widening, thinning vertical kneading operations beneath said rolls.

11. The method of processing cheese curd as defined in claim 1,
including the step of lubricating at least some of said rolls with fine water mist sprays and limiting the quantity of water in said sprays to a minimum amount adequate to inhibit adhesion of curd to the rolls.

12. The method defined in claim 1, wherein the softening operation includes the step of:
circulating heated water through said bath to maintain its temperature at a level from 5 to 10 degrees above the optimum curd temperature for softening.

13. The method defined in claim 1, wherein the softening operation includes the step of:
circulating heated water through said bath to maintain its temperature at a level of about 6 degrees above the optimum curd temperature for softening.

References Cited

UNITED STATES PATENTS

| 2,794,746 | 6/1957 | Schwartz | 99—243 X |
| 3,242,571 | 7/1962 | Langford | 31—46 X |

OTHER REFERENCES

Sanders, P. S.: Cheese Varieties and Descriptions, U.S. Dept. Agric., AGR Handbook No. 54 (pp. 80, 81, 114 and 115).

A LOUIS MONACELL, *Primary Examiner.*

D. M. NAFF, *Assistant Examiner.*

U.S. Cl. X.R.

31—89; 99—243